April 10, 1951     E. W. GOSSWILLER     2,548,154
ROTATABLE WARNING SIGNAL LIGHT
Filed Feb. 16, 1946     4 Sheets-Sheet 4
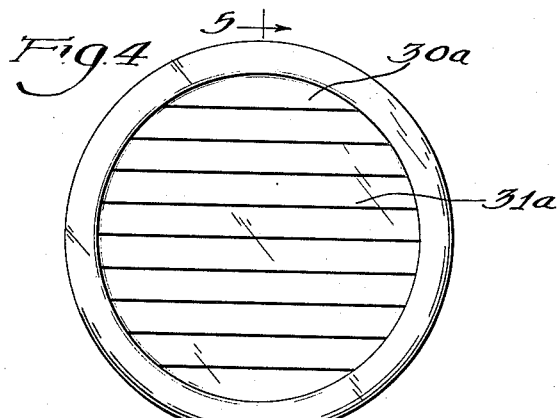
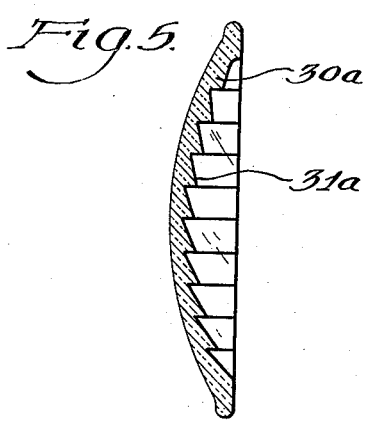
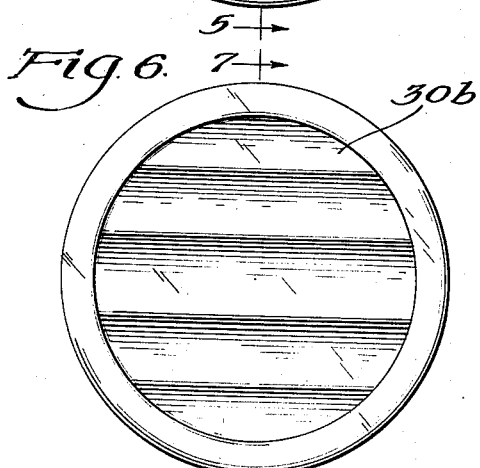
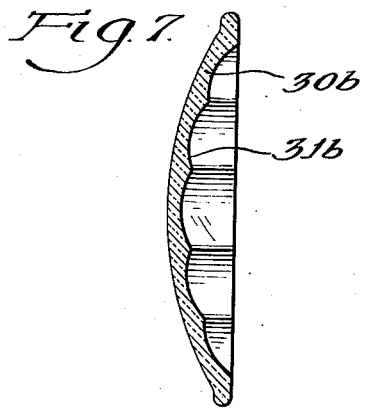
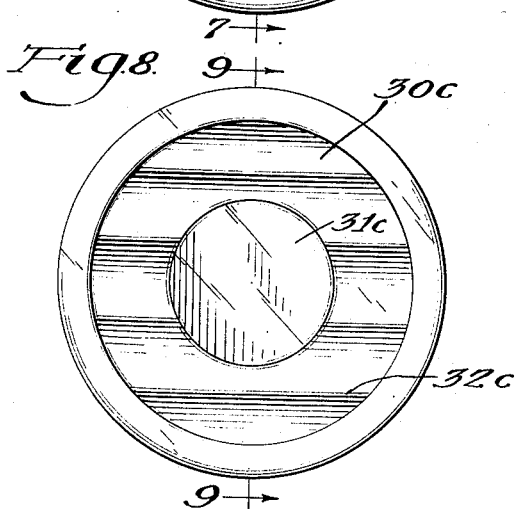
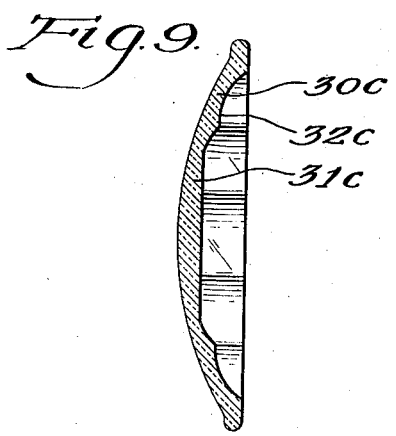
Inventor:
Earl W. Gosswiller
By: Lee J. Gary
Attorney Patented Apr. 10, 1951

2,548,154

UNITED STATES PATENT OFFICE 2,548,154

ROTATABLE WARNING SIGNAL LIGHT

Earl W. Gosswiller, Chicago, Ill., assignor to Federal Enterprises, Inc., a corporation of New York Application February 16, 1946, Serial No. 648,119

2 Claims. (Cl. 240—48)

This invention relates to improvements in signal lights and refers specifically to a signal light construction wherein an entire light assembly, comprising a reflector, light source and prismatic lens, is rotated to project attractive, attention-arresting rotating beams of light.

It has heretofore been proposed, in signal light constructions to rotate a prismatic lens positioned at the mouth of a stationary reflector which carries a stationary source of light. The rotation of the prismatic lens results in the projection of rotating refracted light beams which concentrate the light emanating from the light source along predetermined beams which are continuously moved.

In view of the fact that the lens is rotated, at the mouth of the reflector, an efficient dust-tight and moisture-tight seal cannot be effected between the periphery of the lens and the reflector mouth. This results in rapid deterioration of the reflector surface with consequent diminution of reflected light.

It is an object of my present invention to employ a unitary light assembly, such as the usual automobile "sealed beam" headlight, and provide means for rotating the entire assembly including the reflector, light source and prismatic lens to accomplish the purpose of projecting rotating beams of light.

Another object of my invention resides in the provision of rotating means for rotating an integral light assembly, as hereinabove described, which is simple in construction and operation and can be manufactured and maintained economically.

Other objects and advantages of my invention will be apparent from the accompanying drawings and following detailed description.

In the drawings, Fig. 1 is a sectional elevational view of a signal light embodying the concepts of my invention.

Fig. 4 is a front elevational view of one form of prismatic lens which may be employed with my invention.

Fig. 5 is a transverse sectional view taken on line 5—5 of Fig. 4.

Fig. 6 is a front elevational view of another form of prismatic lens.

Fig. 7 is a transverse sectional view taken on line 7—7 of Fig. 6.

Fig. 8 is a front elevational view of a further form of prismatic lens.

Fig. 9 is a transverse sectional view taken on line 9—9 of Fig. 8.

Figure 1:
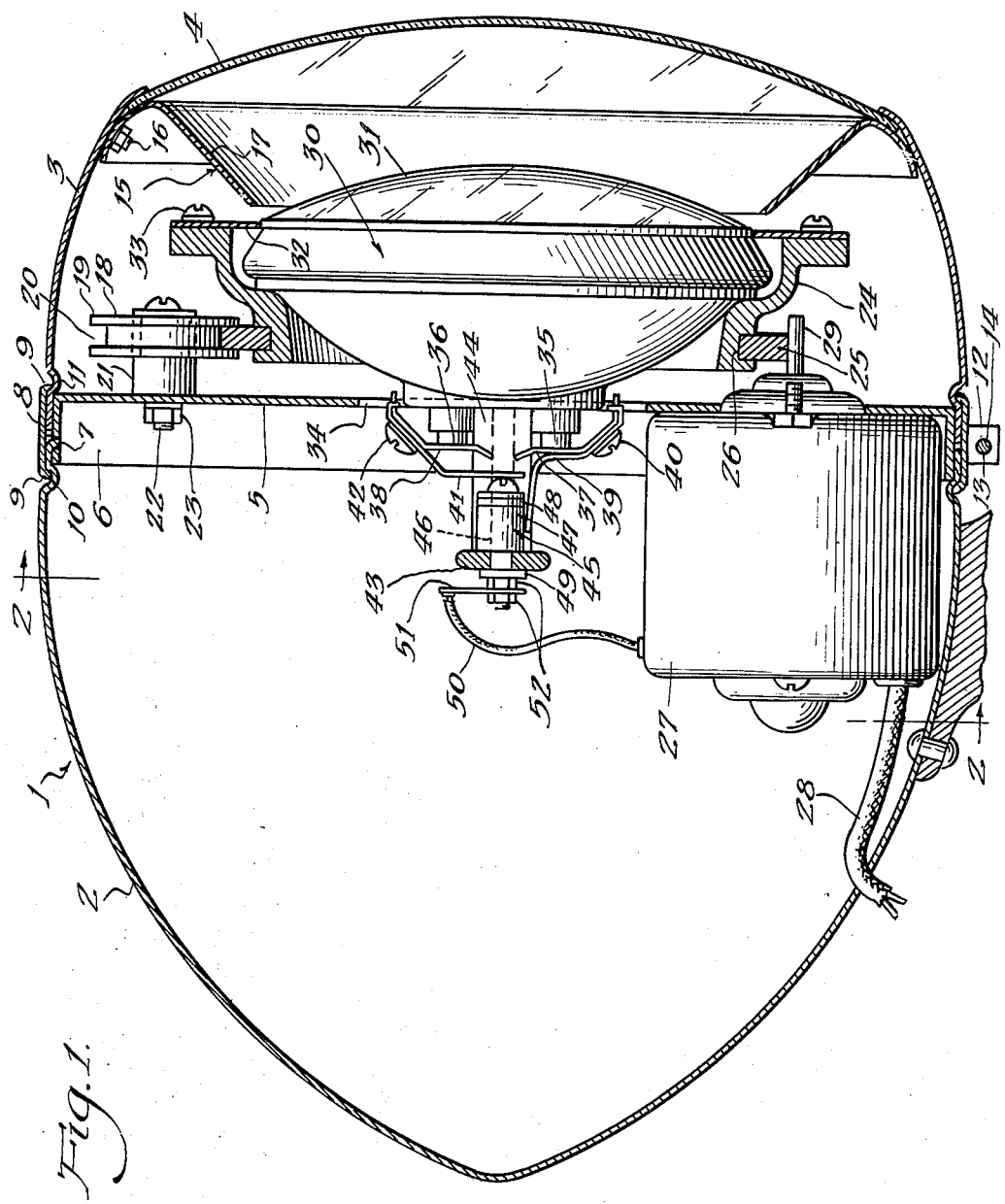

Referring in detail to the drawings, 1 indicates generally a housing in which my improved signal light is adapted to be positioned. The housing 1 comprises a rear shell 2 which preferably takes a tear-drop or streamlined shape. The housing 1 also comprises a front or forward portion 3 which is provided with an open mouth adapted for the reception of a translucent closure 4. At the mouth portion of the rear shell 2, a partition plate 5 is carried, said plate being provided with an annular flange 6 into which the edge portion of the mouth of the shell 2 is adapted to engage as indicated at 7 in Fig. 1. The edge portion of the front shell 3 is positioned over the flange 6 and both shells are secured together as a unitary structure by means of a split annular ring 8. The marginal portions 9 of the annular ring 8 are offset as shown best in Fig. 1 and are adapted to project into annular grooves 10 and 11 provided in shells 2 and 3. A lug 12 is mounted on the adjacent ends of the split ring 8 and each is provided with an opening 13 through which a screw 14 passes whereby the ring 8 may be securely clamped upon the shells 2 and 3.

Adjacent the mouth of the shell 3 a reflector 15 is positioned, said reflector being secured to the shell 3 by means of bolts 16. The reflector 15 is provided with a frustro-conical reflecting surface 17 which tapers inwardly toward a signal light, hereinafter more fully described, which is positioned within the casing. The peripheral portion of closure 4 is confined between the reflector member 15 and the marginal portion of shell 3. The closure 4, if desired, may be colored red or green or any desired color and is preferably a plain or non-refracting lens.

Three rollers 18 are mounted in circumferentially spaced relationship upon the forward face of the partition 5. The rollers 18 are provided with flanges 19 defining an annular groove 20. The rollers 18 are mounted upon shafts 21 which are carried by bolts 22 which in turn are appropriately secured, for instance, by means of nuts 23, to the partition plate 5.

A retaining frame 24 is adapted to be positioned between the plate 5 and the open-mouth portion of the reflector 15. A tire 25 is carried in an annular groove 26 in the frame 24, the tire 25 being preferably constructed of rubber or other relatively resilient frictional material and being removably positioned in the groove 26. A motor 27 is positioned within the casing 1 and is connected by means of wires 28 to a suitable source of electric current (not shown).

The shaft 29 of the motor 28 projects within the confines of the shell 3 and is adapted to make frictional contact with the outer surface of the tire 25 whereby the retaining frame 24 may be rotated, the rotation being guided by the circumferentially spaced rollers 18.

A light assembly 30 is adapted to be carried by the retaining frame 24. The light assembly 30 may take the form of the usual "sealed beam" headlight common with present day automobiles and may comprise a reflector of parabolic or spherical shape (not shown). The light 30 also comprises a prismatic lens 31 which is preferably of such construction as to refract a portion of the light rays reflected from the reflector positioned within the assembly 30.

As examples of the types of refracting lenses which may be employed, reference is particularly made to Figs. 4 to 9 inclusive. In Figs. 4 and 5 a prismatic lens 30a is illustrated which is provided with a plurality of flutes 31a upon its rear face, the function of the flutes being to deflect the light beam at an angle to the optical axis of the light assembly. In Figs. 6 and 7 another form of refracting lens is illustrated as shown best at 30b. This form of lens is also provided with flutes 31b the function of which is to deflect the light beam at an angle to the optical axis in diverse directions from said axis. In Figs. 8 and 9 a further form of prismatic lens is illustrated at 30c. In this form of lens the central portion thereof, at the rear face, is flat as indicated at 31c. Bordering the central portion 31c are flutes 32c similar to the flutes 31b. In this form of lens a central light beam is projected along the optical axis of the light assembly through the central portion 31c of the lens. The flutes 32c refract the remaining light at an angle to the optical axis of the light assembly in both directions and in diverse directions away from said axis.

A resilient annular ring 32 is secured by means of screws 33 to a portion of the retaining frame 24 whereby the light assembly 30 may be securely mounted in a central position upon the frame 24.

The arrangement is such that when the frame 24 is rotated, thereby rotating the light 30, moving refracted beams of light will be projected through the closure 4. The prismatic construction of the lens 31 is preferably such that those beams which are refracted will be concentrated, as opposed to a prismatic construction which would tend to diffuse the light. Consequently, with a suitable light source positioned within the light 30 (not shown) the moving or rotating beam will be projected at relatively great distances from the signal light.

The central portion of the plate 5 is provided with a circular aperture 34 through which terminals 35 and 36 of the light 30 project. A metallic electrical conducting strip 37 is secured to terminal 35, preferably being welded or brazed thereto. Similarly an electrical conductive metallic strip 38 is secured to terminal 36. A spring contact arm 39 is secured by means of screw 40 to the strip 37 and similarly a spring contact arm 41 is secured by means of screw 42 to the strip 38.

Figure 2:
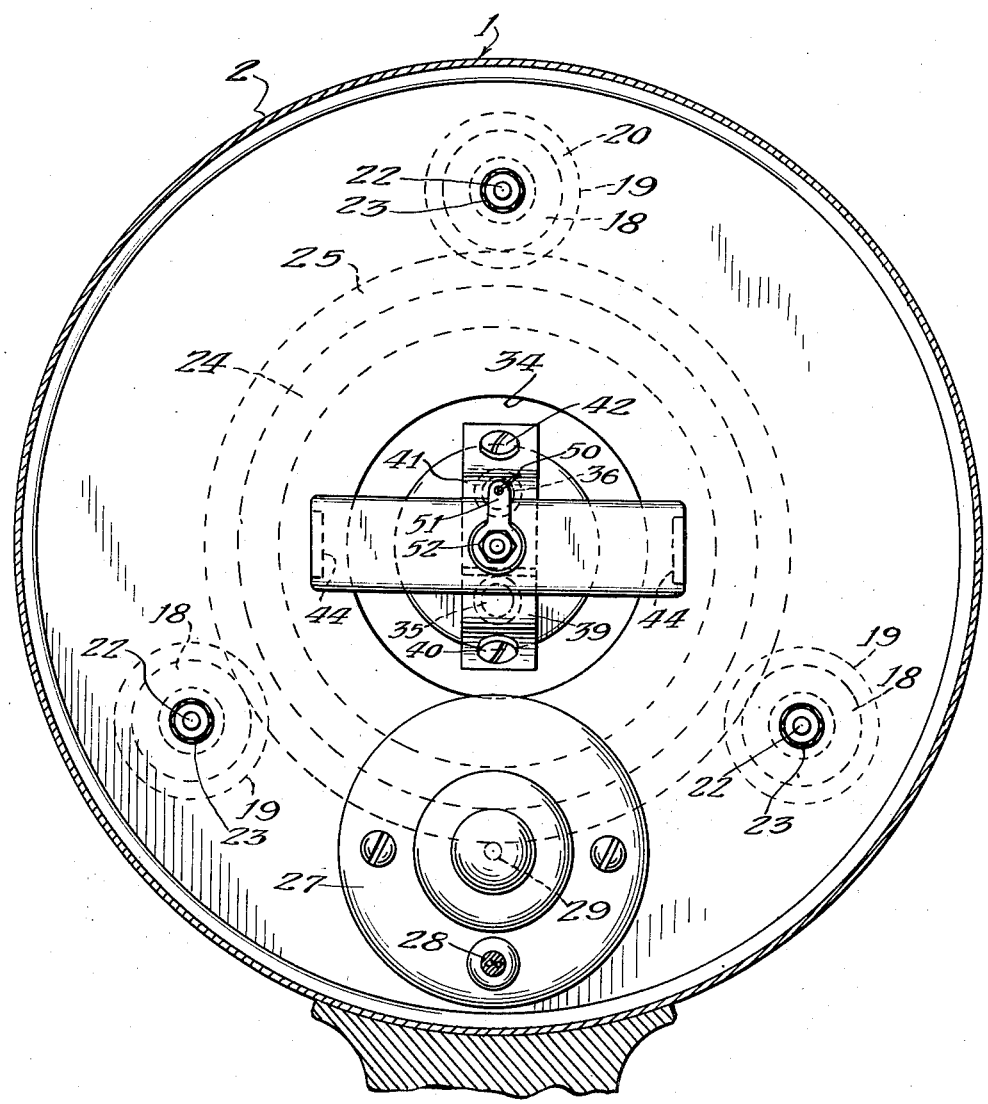
Fig. 2 is a transverse sectional view taken on the line 2—2 of Fig. 1.

A bar 43 is disposed in spaced relationship with respect to the plate 5, the ends of said bar being secured to supports 44 (Fig. 2) which in turn are mounted upon plate 5 on diametrically opposite sides of the aperture 34. Positioned at the central portion of the plate 43 is a contact member 45. A bolt 46 comprises a portion of said contact member and projects through a sleeve 47 which also comprises a portion of the contact member. The bolt 46 is electrically insulated from the sleeve 47 by means of non-conductive washers 48 and 49. An electric wire 50 makes contact with a suitable soldering lug 51 which is secured to the bolt 46 by means of nuts 52.

The arrangement is such that the member 41 contacts the end or head of the bolt 46 and the member 39 makes contact with the outer surface of the sleeve 47. The sleeve 47 is grounded to one of the conductors brought in through the cable 28 and completion of the circuit is provided through one of the wires 50 which carries the current of higher potential. It can readily be seen that by this arrangement the frame 24 may be rotated by the motor 27 and electrical connections for the light source within the light 30 may be provided by the rotating arms 41 and 39.

Figure 3:
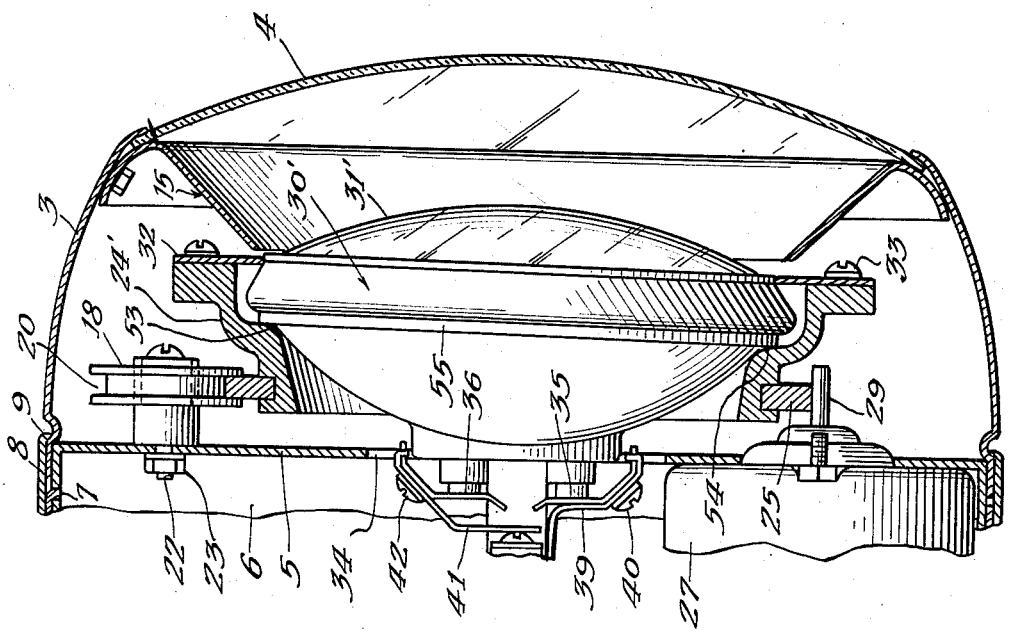
Fig. 3 is a sectional elevational view of a modification of my signal light.

Referring particularly to Fig. 3, a slight modification of my signal light is illustrated. For purposes of clarity of description, those portions of the structure shown in Fig. 3 which are identical with corresponding elements hereinbefore described in conjunction with Figs. 1 and 2, will be given the same corresponding reference numerals.

In this form of my invention a retaining frame 24' is adapted to carry a sealed beam lamp 30'. The lamp 30' is similar to the lamp 30 hereinbefore described except that it carries a plain transparent closure 31' instead of a prismatic lens 31. The retaining frame 24' is of such construction that the lamp 30' is held in such a manner that its optical axis makes an angle with the longitudinal axis of the light assembly 1.

The frame 24' is mounted for rotation within the casing 3 and is driven by a motor 27 through the agency of a tire 25 which is guided by the rollers 18. It will be noted that shoulder 53 is offset from shoulder 54 so as to cant the light 30' upon its seat within the frame 24'. Although the lamp 30' rotates about an axis which is not coincident with its optical axis, the resilience of contact springs 39 and 41 is sufficient to maintain electrical contact with the sleeve 47 and the head of the bolt 46.

It can be seen that when the frame 24' is rotated, the beam of light 1 which is cast along the optical axis of the lamp 30' also rotates and produces an effect which is analogous to the rotation of the lamp 30 with its prismatic lens 31. Of course, if desired, the lens 31' may comprise a prismatic lens such as illustrated in Figs. 4 to 9 inclusive in which case an added attractive effect would be produced which would make toward an efficient signal light.

It is to be understood, of course, that the shoulders 53 and 54 are continuous throughout the circumference of the frame 24' and contact at rear portion or bead 55 of the lamp 30 at all points throughout its circumference.

Another manner in which a rotating beam may be projected from my signal lamp wherein a plain lens may be used, is to offset the filament (not shown) of the lamp from its focal position in front of the reflector. It can readily be seen that if such a lamp is carried by frame 24, a rotating beam will be projected from the signal light when the frame is rotated. It will also be obvious that any one or more of the expedients hereinbefore described may be employed. For example, a lamp having a prismatic lens and being held in a frame similar to frame 24 and having its light source offset from the focus of the reflector may be utilized, or a lamp similar to lamp 30' having a prismatic lens similar to the lens 31 may be rotated in a frame such as frame 24', the lamp having its light source offset from the focus of the reflector. It can readily be seen that many desirable attractive moving beam arrangements may be secured.

I claim as my invention:

1. A signal light comprising a casing having a translucent wall, a partition mounted in said casing, circumferentially spaced guide rollers carried by said partition, a retaining frame, a resilient tire carrier by said frame, said tire and frame being rotatably carried by said guide rollers, a unitary light assembly disposed substantially centrally behind said transparent wall, comprising a coaxially disposed reflector and lens and interposed electric light source removably mounted upon said frame, rotary driving means frictionally contacting said tire for rotating said frame to project from said casing through said transparent wall a concentrated rotating beam of light.

2. A signal light comprising a casing having a transparent wall, a partition mounted in said casing, circumferentially spaced guide rollers carried by said partition, a retaining frame, a resilient tire carried by said frame, said tire and frame being rotatably carried by said guide rollers, a light assembly comprising as a unit a reflector, a light refracting prismatic lens and electric light source all having a common optical axis, said unit being removably mounted upon said retaining frame, and rotary driving means frictionally contacting said tire for rotating said retaining frame to rotate said light assembly about its optical axis to project a concentrated rotating beam of light from said casing at an angle to the optical axis of said light assembly, the optical axis of said light assembly being substantially coaxial with the central portion of said transparent wall.

EARL W. GOSSWILLER.

REFERENCES CITED

The following references are of record in the file of this patent:

UNITED STATES PATENTS

| Number | Name | Date |
|---|---|---|
| 1,635,517 | Tyler | July 12, 1927 |
| 1,731,960 | Wilson | Oct. 15, 1929 |
| 1,761,361 | Oberg et al. | June 3, 1930 |
| 1,803,599 | Craig | May 5, 1931 |
| 2,148,314 | Wright | Feb. 21, 1939 |
| 2,151,600 | Janzen | Mar. 21, 1939 |
| 2,411,935 | O'Farrell | Dec. 3, 1946 |
| 2,446,333 | Kennelly | Aug. 3, 1948 |
| 2,475,365 | Walsh | July 5, 1949 |